United States Patent Office 2,806,805
Patented Sept. 17, 1957

2,806,805

METALLIC ARC ELECTRODE FOR WELDING COPPER AND COPPER ALLOYS

Rene David Wasserman, Stamford, Conn., and Joseph F. Quaas, Island Park, N. Y., assignors to Eutectic Welding Alloys Corporation, Flushing, N. Y., a corporation of New York No Drawing. Application October 28, 1954, Serial No. 465,442

5 Claims. (Cl. 117—202)

This invention relates to an improved metallic arc welding electrode for welding copper and copper alloys and more particularly to a covered electrode of the high phosphorus copper alloy type which exhibits a heretofore unobtainable quiet and steady arc.

It has long been the practice in the metallic arc welding of copper and copper alloys to employ bare copper core wires to which has been added relatively small amounts of phosphorus for the purpose of imparting fluidity to the deposited metal, assist in deoxidizing the molten filler metal and also to provide a vaporous ionic carrier medium for maintaining the arc. In practice, bare core wires of this type have not proven effective due to a wandering and unstable arc action. Continuous attempts to rectify this condition by reason of conjoint use of independent fluxing and arc stabilizing materials and/or by application of coverings to the core have failed to solve the problem. At the present time, the art has resorted to using copper core wire to which is applied a heavy, substantially pure fluoride coating, but this type of electrode provides only fair results on copper and totally unsatisfactory results on copper alloys such as brass and bronze.

It is therefore an object of the present invention to provide an improved metallic arc electrode which is highly efficient for arc welding of both pure copper and various copper alloys. A further object of the invention is to provide an improved covered electrode for metallic arc applications in treating copper base materials with a highly suitable arc action and an enhanced ease of application. A still further object of the invention is the provision of an improved covering for copper base electrode core wires. Other and distinct objects of the invention will become apparent from the description and claims which follow.

In accordance with the present invention, it has been discovered that the metallic arc treating of copper base alloys can be materially improved by using a lightly covered high phosphorus copper alloy as the electrode. As previously indicated, efforts have been made heretofore to provide an efficient electrode for application to copper base alloys, as for example as shown in the prior U. S. Letters Patent 2,142,673 and 2,456,609. Additionally, further efforts of an analogous nature, which have not proven to be wholly successful in practice, have been the application of a substantially pure fluoride coating on aluminum-bronze electrode cores, as for example as described in U. S. Letters Patent 2,261,779. One particular reason for the failure of these prior art practices has been an inability to simultaneously obtain a low-melting point alloy and satisfactory transfer of the low-melting point metal across the arc in a non-sporadic operation. This is wholly obviated with the phosphorus-copper core and light covering according to the invention by reason of the combined action of the special covering and the special alloy which simultaneously provide a desired low-melting point and excellent capillary flow in the alloy, good arc stability, and a satisfactory fluxing and cleaning of the work.

In accordance with the invention, the improved metallic arc electrode is formed from an alloy containing between 4 and 9% phosphorus, between 1 and 15% silver the balance being formed of copper. To the core having this composition there is applied an especially formulated thin covering compounded from between 40 and 60 parts cryolite, between 20 and 40 parts sodium or potassium chloride, and between 5 and 20 parts powdered glass of a low-melting type, such as a boro-silicate, soda-lime and/or soda-lithium type, all parts by weight. These low-melting glasses are well known and all soften and/or melt between 600° and 700° C. As will be readily understood by those skilled in the art, the alloy can be readily prepared by forming a melt in an electric furnace in a known manner such that commercial impurities are maintained below 1.0%. In like manner, the covering can be formed by admixing the ingredients as powdered constituents, as by milling them together until a homogeneous mix is obtained and then forming an external plastic mass by combining the mixture with a conventional binder such as water glass, agglutinates, or the like. Alternatively, the covering can be plasticized after mixing by heating the same to the melting point of the glass (between 600° and 700° C.) but below the melting point of the other constituents and subsequently extruding the melt as a covering about the alloy core material. Having generally described the invention, reference will now be made to specific examples of the same which have proven exceedingly effective in practice.

*Example I*

| Core wire: | Percent by weight |
|---|---|
| Copper | 83 |
| Phosphorus | 7 |
| Silver | 10 |

| Covering: | Parts by weight |
|---|---|
| Cryolite | 55 |
| Sodium or potassium chloride | 35 |
| Powdered low-melting glass | 10 |

*Example II*

| Core wire: | Percent by weight |
|---|---|
| Copper | 85 |
| Phosphorus | 7 |
| Silver | 8 |

| Covering: | Parts by weight |
|---|---|
| Cryolite | 45 |
| Sodium or potassium chloride | 40 |
| Powdered low-melting glass | 15 |

*Example III*

| Core wire: | Percent by weight |
|---|---|
| Copper | 80 |
| Phosphorus | 5 |
| Silver | 15 |

| Covering: | Parts by weight |
|---|---|
| Cryolite | 60 |
| Sodium chloride | 20 |
| Low-melting powdered glass | 20 |

The superiority of the instant cover electrode was demonstrated by testing the same comparatively with contemporary electrodes on copper and copper base alloys. In particular, tests conducted on various brasses and silicon-bronzes exhibited a greatly improved efficiency over known techniques. Attempts at arc welding brass and silicone-bronze parent metals with bare copper alloy core wires proved wholly unsatisfactory. When application of known, substantially pure fluoride coatings were applied to the core wires, the welding operation proceeded with slightly improved but still unsatisfacory results. On the other hand, when the core wire was formed of a composition within the ranges previously mentioned herein and covered with a very thin coating compounded as heretofore indicated, preferably to a thickness of between .200 and .220 inches, welding of substantially all commercial types of copper alloys was readily obtained. In particular, it was specifically noted that the more common forms of brass and silicon-bronze which had resisted bonding by prior techniques were readily joined with the greatest of ease using the improved electrode. Another wholly unexpected advantage was an ability to reduce the welding current from the conventionally recommended value of 200 amperes for an electrode of 3/16 inch diameter to 130 amperes. In addition, the improved electrode facilitated obtaining even deposition of weld metal and a quiet, steady arc with substantially constant burn-off rate for the core material. The weldments produced were more dense and free of oxide inclusions facilitating easier machining. In effect, the entire welding process was radically changed from one requiring the exercise of the utmost skill and attention to a simplified operation comparable to common soldering and brazing techniques.

While the specific composition for the core wire, as set forth supra, is preferred, it will be understood by those skilled in the art that small amounts of other metals such as titanium, nickel and the like may be substituted in part for a portion of the silver content. It will also be understood by those skilled in the art that although natural cryolite is preferred for use in the covering, it may be replaced in part by lithium or sodium fluoride. The low-melting powdered glass is preferred to have a composition as set forth in the copending application of Rene D. Wasserman et al., Serial No. 427,397, filed May 3, 1954, although the previously mentioned low-melting glasses may be used without detracting from the essence of the invention.

As many apparently widely different embodiments of this invention may be made without departing from the spirit and scope hereof, it is to be understood that the above invention is not limited, except as defined in the appended claims.

What is claimed is:

1. An improved metallic arc electrode for welding copper and copper alloys comprising an alloy core containing between 4 and 9% phosphorus, between 1 and 15% silver, balance copper, and overlaid with a thin adherent flux coating consisting of between 40 and 60 parts by weight cryolite, between 20 and 40 parts by weight alkali metal chloride and between 5 and 20 parts by weight of a low-melting glass including sodium silicate and selected from the group consisting of soda-lime glass, soda-lithium glass and boro-silicate glass having a softening temperature between about 600° and 700° C.

2. An improved metallic arc electrode for welding copper and copper alloys comprising an alloy core containing 83% copper, 7% phosphorus, and 10% silver, and overlaid with an adherent flux coating consisting of 55 parts cryolite, 35 parts of a chloride selected from the group consisting of sodium and potassium chloride, and 10 parts powdered low-melting glass including sodium silicate and selected from the group consisting of soda-lime glass, soda-lithium glass and boro-silicate glass, all percentages and parts being by weight.

3. An improved metallic arc electrode for welding copper and copper alloys comprising an alloy core containing 85% copper, 7% phosphorus, and 8% silver, and overlaid with an adherent flux coating consisting of 45 parts cryolite, 40 parts of a chloride selected from the group consisting of sodium and potassium chloride, and 15 parts powdered low-melting glass including sodium silicate and selected from the group consisting of soda-lime glass, soda-lithium glass and boro-silicate glass, all percentages and parts being by weight.

4. An improved metallic arc electrode for welding copper and copper alloys comprising an alloy core containing 80% copper, 5% phosphorus, and 15% silver, and overlaid with an adherent flux coating consisting of 60 parts cryolite, 20 parts sodium chloride, and 20 parts low-melting powdered glass including sodium silicate and selected from the group consisting of soda-lime glass, soda-lithium glass and boro-silicate glass, all percentages and parts being by weight.

5. A flux covering for application to copper base core wires intended for use in metallic arc welding of copper alloy parent metals having the following composition: between 40 and 60 parts of cryolite, between 20 and 40 parts of a chloride selected from the group consisting of sodium and potassium chloride, and between 5 and 20 parts powdered glass including sodium silicate and selected from the group consisting of soda-lime glass, soda-lithium glass and boro-silicate glass, all parts being by weight.

References Cited in the file of this patent

UNITED STATES PATENTS

| | | |
|---|---|---|
| 1,538,355 | Rossi | May 19, 1925 |
| 1,829,903 | Leach | Nov. 3, 1931 |
| 2,320,676 | Swift | June 1, 1943 |
| 2,320,677 | Swift | June 1, 1943 |